US009218808B2

(12) United States Patent
Milstein

(10) Patent No.: US 9,218,808 B2
(45) Date of Patent: Dec. 22, 2015

(54) COMPUTER-IMPLEMENTED SYSTEM AND METHOD FOR REDUCING VOICE TRANSCRIPTION ERROR

(71) Applicant: Intellisist, Inc., Seattle, WA (US)

(72) Inventor: David Milstein, Redmond, WA (US)

(73) Assignee: Intellisist, Inc., Seattle, WA (US)

( * ) Notice: Subject to any disclaimer, the term of this patent is extended or adjusted under 35 U.S.C. 154(b) by 0 days.

(21) Appl. No.: 14/636,087

(22) Filed: Mar. 2, 2015

(65) Prior Publication Data

US 2015/0170639 A1 Jun. 18, 2015

Related U.S. Application Data

(63) Continuation of application No. 14/171,732, filed on Feb. 3, 2014, now Pat. No. 8,972,261, which is a continuation of application No. 12/840,190, filed on Jul. 20, 2010, now Pat. No. 8,645,136.

(51) Int. Cl.

*G10L 15/01* (2013.01)
*G10L 15/06* (2013.01)
*G10L 15/26* (2006.01)

(52) U.S. Cl.

CPC ............... *G10L 15/063* (2013.01); *G10L 15/06* (2013.01); *G10L 15/26* (2013.01); *G10L 15/01* (2013.01); *G10L 2015/0631* (2013.01); *G10L 2015/0638* (2013.01)

(58) Field of Classification Search

CPC .......... G10L 15/04; G10L 15/06; G10L 15/26
See application file for complete search history.

(56) References Cited

U.S. PATENT DOCUMENTS

| | | | | |
|---|---|---|---|---|
| 5,787,230 | A * | 7/1998 | Lee | 704/235 |
| 6,556,127 | B1 * | 4/2003 | Moser et al. | 340/5.84 |
| 6,985,862 | B2 | 1/2006 | Ström et al. | |
| 7,031,925 | B1 | 4/2006 | Goldberg | |
| 7,401,023 | B1 * | 7/2008 | Schwartz et al. | 704/275 |
| 7,412,383 | B1 * | 8/2008 | Alonso et al. | 704/236 |
| 7,447,636 | B1 | 11/2008 | Schwartz et al. | |
| 7,630,900 | B1 | 12/2009 | Strom | |
| 2005/0105712 | A1 * | 5/2005 | Williams et al. | 379/265.02 |
| 2006/0149555 | A1 * | 7/2006 | Fabbrizio et al. | 704/275 |
| 2006/0212293 | A1 | 9/2006 | Tur | |

* cited by examiner

*Primary Examiner* — Eric Yen
(74) *Attorney, Agent, or Firm* — Patrick J. S. Inouye; Krista A. Wittman

(57) ABSTRACT

A computer-implemented system and method for reducing voice transcription error is provided. Audio data is received during a call and parsed into utterances. A transcribed value and confidence score are assigned to each utterance. Those utterances with low confidence scores are identified as questionable utterances. One of the questionable utterances is selected from the audio data and a pool of questionable utterances is formed. The pool includes the selected questionable utterance and other questionable utterances, from other calls, that are similar to the selected questionable utterance. A size threshold is applied to the pool of questionable utterances. All the questionable utterances in the pool are provided to at least one human transcriber when the pool fails to satisfy the size threshold. Further transcribed values are received from the transcriber for each of the questionable utterances in the pool.

18 Claims, 9 Drawing Sheets

30

Message No.: 1541
Date: 1/1/10
Time: 1:00 a.m.
Sender: Jeff
Recipient: Howard

Good Morning "111100-75%" - it's Jeff - just about "X2000-50%" - "Y4359-65% to follow up with you on the - I

COMPUTER-IMPLEMENTED SYSTEM AND METHOD FOR REDUCING VOICE TRANSCRIPTION ERROR

CROSS-REFERENCE TO RELATED APPLICATION

This application is a continuation of U.S. Pat. No. 8,972,261, issued Mar. 3, 2015, which is a continuation of U.S. Pat. No. 8,645,136, issued Feb. 4, 2014, the disclosures of which are incorporated by reference.

FIELD

The present invention relates in general to speech recognition, in particular, to a system and method for reducing voice transcription error.

BACKGROUND

Automated speech recognition is commonly used in call centers to convert voice signals from callers into text. Generally, a call or voice recording is received into the call center and speech is obtained. The speech is input into an automated speech recognition system, which parses the speech into short segments and assigns phonemes to the segments. The phonemes are analyzed and compared to a grammar of known words, phrases, and sentences to provide text values for the speech.

Once converted, the text can be used to store a record of a call, to identify characteristics of the call, or as a confirmation of the call. Speech recognition is also widely used in other fields, including the legal field for court reporting and dictation, and the medical field. The benefits of automated speech recognition include a reduction in the cost of employees required to manually transcribe voice messages and an increase in transcription speed. However, a lack of transcription accuracy is a barrier to widespread use of automated speech recognition.

A conventional approach using automated speech recognition and manual transcription has been implemented as an attempt to address and improve transcription accuracy. Generally, a voice message is first transcribed via automated speech recognition. Subsequently, an accuracy threshold is applied to the transcribed voice message. If the accuracy of the transcribed message is above the threshold, the transcribed voice message is provided to a user or stored. Whereas, if the accuracy of the transcribed message is below the threshold, the entire voice message is transmitted to a human transcriber for manual transcription. During manual transcription, each voice utterance in the voice message transmitted to the human transcriber is separately processed, which can be expensive and time consuming.

In large call centers, hundreds or thousands of calls can be received within a relatively short time period. During this time period common utterances are received into the call center from different callers as voice. According to the conventional approach described above, if the transcription of the voice message fails to meet a threshold accuracy, the entire voice message is then manually transcribed, which can be costly and time consuming. Thus, the conventional approach fails to reduce error by identifying similar utterances during a specified time period, manually transcribing at least one of the utterances, and then assigning the transcribed value to the remaining similar utterances.

Therefore, there is a need for providing efficient and cost effective approaches for reducing transcription error via a hybrid of automatic transcription and manual transcription. Preferably, the approach would include a reduction in the amount of manual transcription required by identifying similar utterances, manually transcribing at least one of the similar utterances, and assigning the manually transcribed value to the remaining similar utterances.

SUMMARY

A system and method for reducing transcription error is provided. A voice stream, such as a live voice stream or a recording, is collected and parsed into speech utterances. The voice stream is transcribed by assigning a transcription value and confidence score to each utterance. A threshold is applied to the confidence scores and only those utterances with confidence scores below the threshold are selected as questionable utterances. The questionable utterances have a higher likelihood of being associated with an incorrect transcription value and should be further analyzed. One of the questionable utterances is selected and a pool of similar questionable utterances from other voice streams is generated. Subsequently, a sample is selected from the pool and each utterance in the sample is manually transcribed. If a common transcribed value is assigned to each utterance in the sample, the common transcribed value is then assigned to the remaining questionable utterances in the pool and incorporated into respective transcribed messages. Otherwise, the remaining questionable utterances are each manually transcribed.

One embodiment provides a computer-implemented system and method for reducing voice transcription error. Audio data is received during a call and parsed into utterances. A transcribed value and confidence score are assigned to each utterance. Those utterances with low confidence scores are identified as questionable utterances. One of the questionable utterances is selected from the audio data and a pool of questionable utterances is formed. The pool includes the selected questionable utterance and other questionable utterances, from other calls, that are similar to the selected questionable utterance. A size threshold is applied to the pool of questionable utterances. All the questionable utterances in the pool are provided to at least one human transcriber when the pool fails to satisfy the size threshold. Further transcribed values are received from the transcriber for each of the questionable utterances in the pool.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. The drawings and detailed description are to be regarded as illustrative in nature and not as restrictive.

DETAILED DESCRIPTION

Automated speech recognition provides fairly quick and convenient transcription of voice to text that is frequently used in call centers, as well as the legal and medical industries to reduce costs and increase efficiency. However, conventional systems for automated speech recognition often times achieves the ability to reduce costs and increase efficiency at the expense of transcription accuracy. Quick, easy, and accurate reduction of any transcription errors is desired during transcription. Reducing transcription errors using hybrid voice transcription provides manual review and transcription for at least one utterance from a voice stream and assigning a transcribed value to similar utterances from other voice stream.

Figure 1:
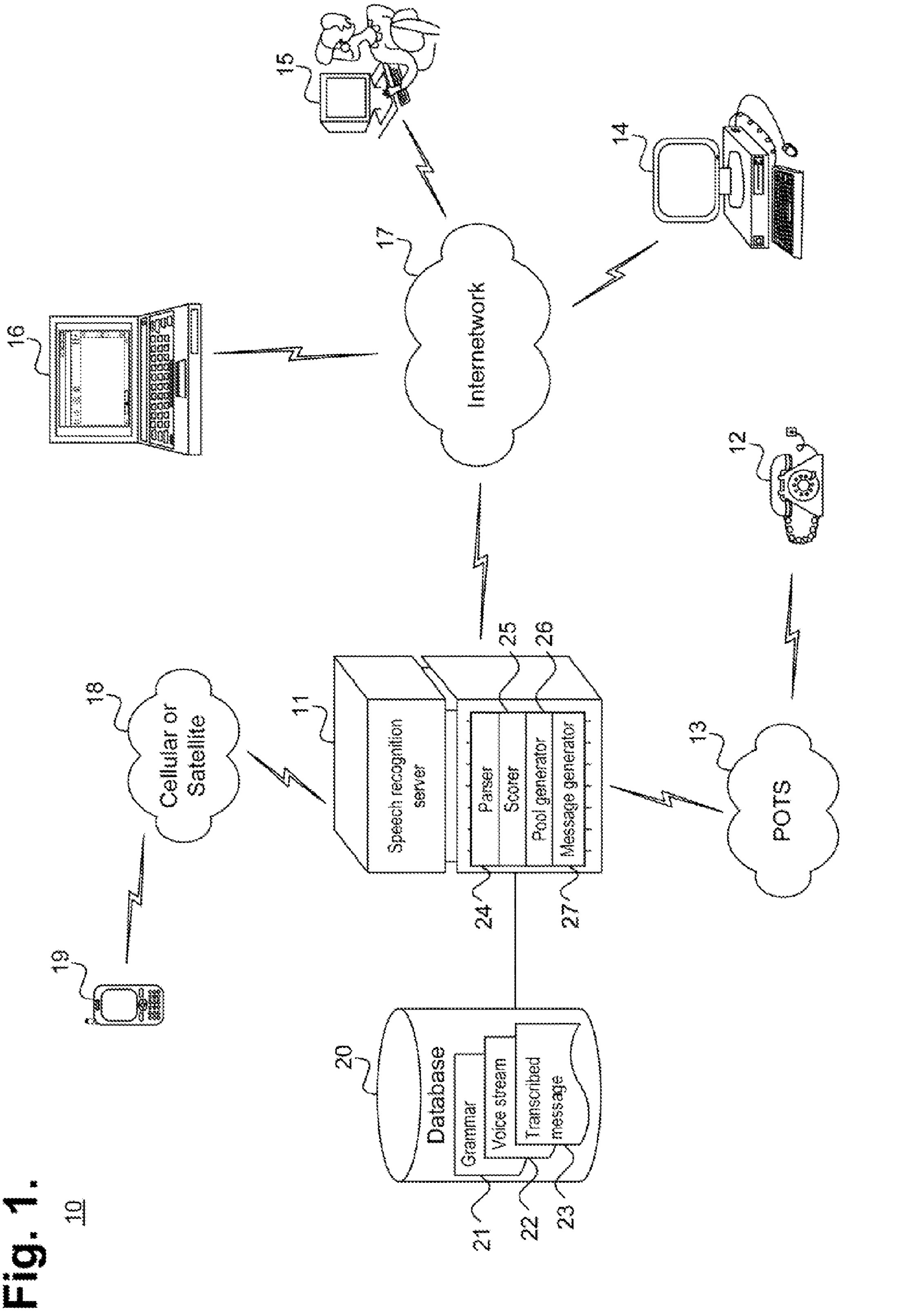
FIG. 1 is a functional block diagram showing a system for hybrid voice transcription, in accordance with one embodiment.

Hybrid voice transcription requires a system involving automated voice recognition with human intervention. FIG. 1 is a functional block diagram showing a system 10 for hybrid voice transcription, in accordance with one embodiment. A speech recognition server 11 is interconnected to conventional telephone handsets 12 through Plain Old Telephone Service (POTS) 13, portable handsets 19 through cellular and satellite telephone service 18, and desktop 14 or portable 16 computers, including VoIP clients, Internet clients and Internet telephony clients, through an internetwork 17, such as the Internet. The speech recognition server 11 receives a voice stream 22 from a user via the conventional telephone handsets 12, portable handsets 19, and computers 14, 16. The voice stream can be provided as a real-time voice stream or as a recorded voice message. The speech recognition server 11 includes a parser 24, scorer 25, pool generator 26, and message generator 27.

The parser 24 identifies the voice stream 22 received on the speech recognition server 11 and parses the stream into utterances, which can include word-level tokens, n-grams, raw terms, noun phrases, and sentences. Other types of utterances are possible. The scorer 25 analyzes the utterances and assigns an initial transcribed value and confidence score to each utterance. The initial transcribed values can be selected from a grammar 21 that is stored in a database 20 coupled to the speech recognition server 20. The transcribed values are combined to generate a transcribed message 23 for the voice stream. The pool generator 26 identifies those utterances in the initial transcribed message with a low confidence score and attempts to group those utterances with similar utterances into a pool. Additionally, the pool generator 26 can select a sample of utterances from the pool and transmit the sample to at least one human transcriber 15 for further processing and analysis. The human transcriber 15 can listen to each utterance in the sample and confirm the initial transcribed value or assign an additional transcribed value. In a further embodiment, the additional processing of the sample is performed automatically, rather than manually. The human transcriber can be an employee of a call center, a third party transcription service, or other business.

The manually transcribed value for each utterance in the sample are transmitted to the speech recognition server 11 and compared. If the manually transcribed values differ, the remaining similar utterances in the pool are also manually transcribed. However, if all manually transcribed values are the same, the common transcribed value is also assigned to the remaining similar utterances in the pool. Subsequently, the message generator 27 incorporates the manually assigned or affirmed transcribed value into the transcribed message for the voice stream 22 from which the utterance was obtained. The transcribed message 23 and corresponding voice stream 22 can be stored in the database 20 for further reference. Further, the transcribed message 23 can be provided to the user.

The handsets 12, 19, computers 14, and speech recognition server 11 each include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to the handsets and computers, are possible.

Additionally, the handsets 12, 19, computers 14, 16, and speech recognition server 11 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
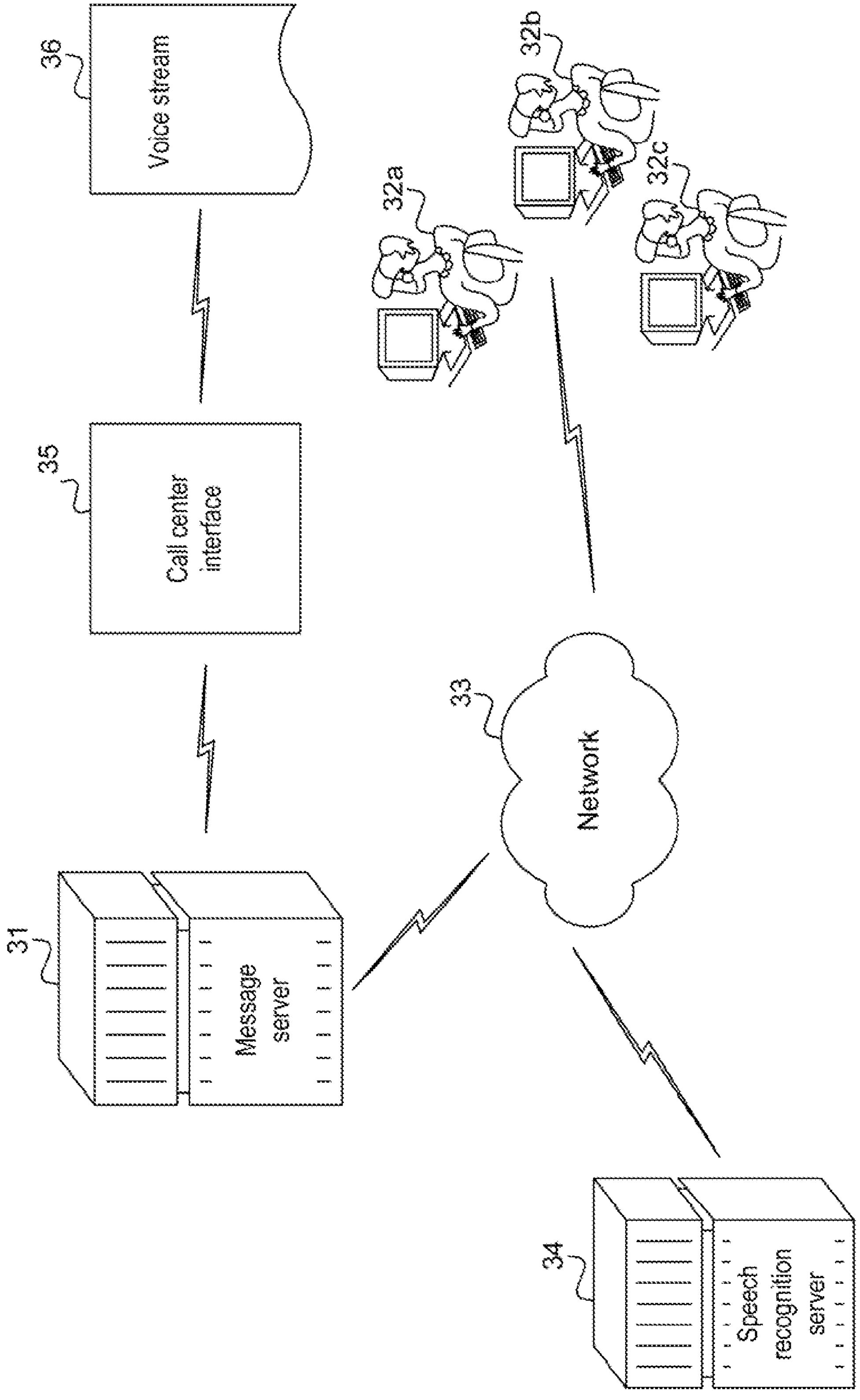
FIG. 2 is a functional block diagram showing, by way of example, the hybrid voice transcription system of FIG. 1 as incorporated into a call center.

The hybrid voice transcription system 10 can be incorporated for use in other systems, including a call center. FIG. 2 is a functional block diagram showing, by way of example, the hybrid voice transcription system of FIG. 1 as incorporated into a call center 30. The call center 30 includes a message server 31 and a speech recognition server 34 operatively interconnected over a network 33, such as an internal network or the Internet. One or more human transcribers 32*a-c* can also be interconnected to the message server 31 and speech recognition server 34 over the network 33. The human transcribers 32*a-c* can be employees of the call center 30, as well as employees of a third party service provider. In a further embodiment, the human transcribers 32*a-c* can be replaced with an automated system for further processing the transcribed messages, including assigning further transcription values to one or more utterances. The network infrastructure can be either wired or wireless and, in one embodiment, is implemented based on the Transmission Control Protocol/Internet Protocol (TCP/IP) network specification, although other types or combinations of networking implementations are possible. Similarly, other network topologies and arrangements are possible.

Incoming customer calls are received through a call interface 35, which is operatively coupled to the message server 31 to provide access to a telephone voice and data network. In one embodiment, the call center interface 35 connects to the telephone network over a T-1 carrier line, which can provide up to 24 individual channels of voice or data traffic provided at 64 kilobits (Kbits) per second. Other types of telephone network connections are possible. Once received, the message server 31 sends streamed audio data from the customer call as a voice stream 36 to the speech recognition server 34, which performs automatic speech recognition by parsing the voice stream into utterances and assigning a transcribed value and confidence score to each utterance.

An accuracy threshold is applied to the confidence scores of the utterances and those utterances with confidence scores below the threshold are selected as questionable utterances. Questionable utterances can include those utterances for which the initial transcribed value has a threshold likelihood of being an incorrect representation of that utterance. Higher confidence scores indicate a higher likelihood that an initial transcribed value assigned to an utterance is an accurate transcription of that utterance. Whereas, lower confidence scores indicate a lower likelihood that an initial transcribed value is an accurate transcription of an utterance. The value of the confidence score assigned reflects the degree of likelihood that an initial transcribed value reflects the corresponding utterance. One or more of the questionable utterances can be transmitted for further analysis, such as by a human transcriber, for confirming the initial transcribed value or for assigning a further transcribed value. Hybrid voice transcription will be discussed below with respect to a call center. However, hybrid voice transcription can also be incorporated for use in other systems for fields, such as the legal or medical fields.

Figure 3:
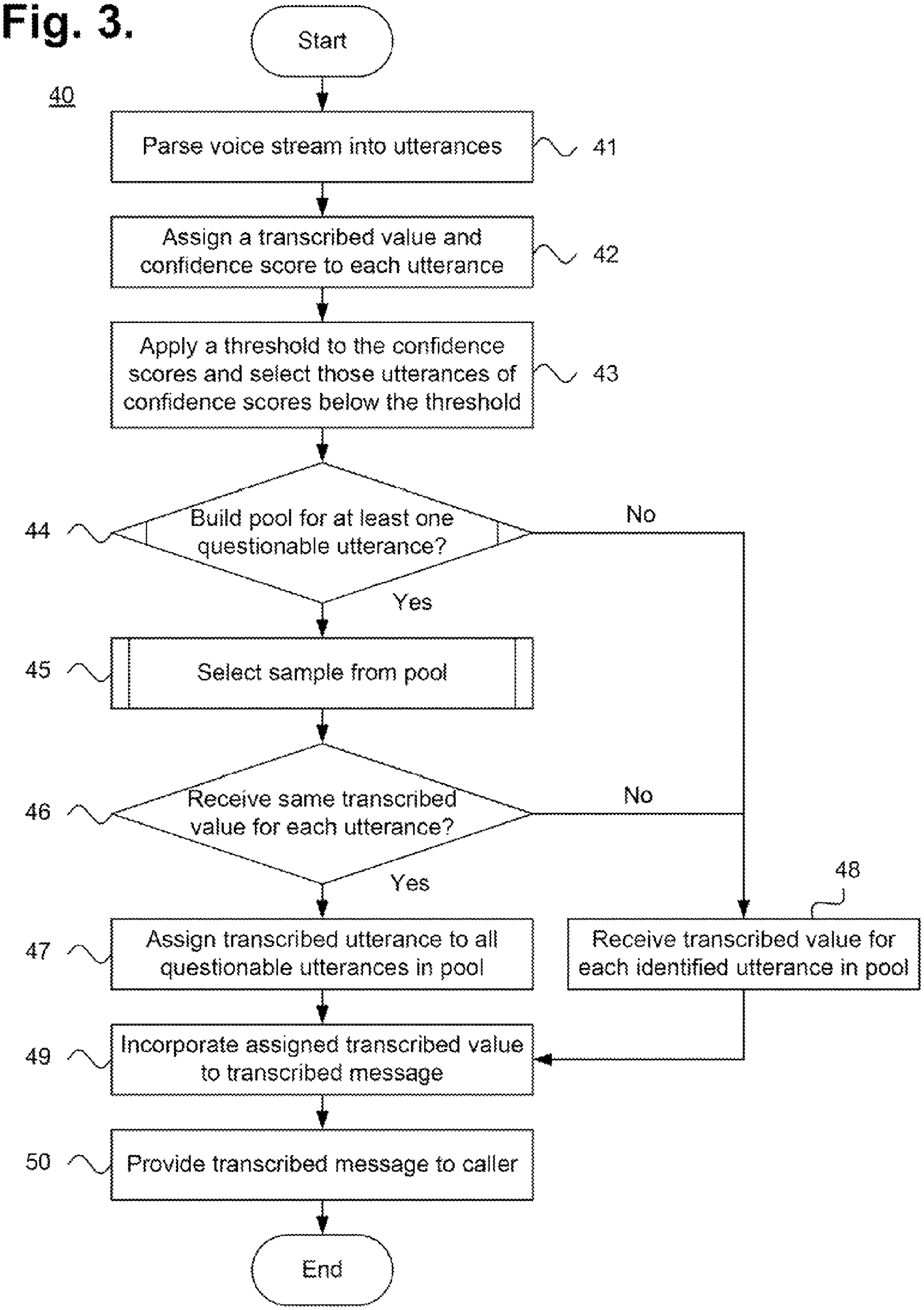
FIG. 3 is a process flow diagram showing a method for hybrid voice transcription, in accordance with one embodiment.

As briefly described above, hybrid voice transcription can occur through a sequence of phases. FIG. 3 is a process flow diagram showing a method 40 for hybrid voice transcription, in accordance with one embodiment. Audio data is received from a caller as a voice stream, which is parsed into utterances (block 41). Each utterance includes tokens, such as words, n-grams, raw terms, noun phrases, and sentences. Other types of utterances are possible. A transcribed value and confidence score are initially assigned to each utterance via automated speech recognition (block 42). The initial transcribed value can include a text representation of the corresponding voice utterance and can be automatically selected from a grammar, which includes a list of common transcribed values that may occur in the voice stream during a call. One or more grammars can be selected based on characteristics of a caller, including geographic location, age, interests, and network. Additionally, the confidence score provides a measure of certainty that the transcribed value accurately represents the voiced utterance. An accuracy threshold is applied to the confidence scores of the utterances and those utterances with confidence score below the threshold are selected for further analysis (block 43). The threshold can be automatically determined or manually set, such as by an employee of a call center, including a manager. At least one of the questionable utterances is selected and attempts to build a pool of similar questionable utterances for the selected questionable utterance are made (block 44). If a pool is formed, one or more of the similar questionable utterances can be selected as a sample for further analysis. The information from the further analysis can be used to confirm the accuracy of or change the initial transcribed value assigned to the remaining similar questionable utterances in the pool without having to be individually reviewed by a manual transcriber.

Building the pool of similar questionable utterances can include identifying a predetermined number of similar questionable utterances within a predetermined timed frame. Identifying similar questionable utterances for inclusion in a pool is further discussed below with reference to FIG. 4. If an appropriate sized pool of similar questionable utterances are not identified within the predetermined time frame, each of the similar questionable utterances are transmitted to a human transcriber (block 48) for confirming the initial assigned transcribed value or for assigning a further transcribed value. However, if an appropriate sized pool of similar questionable utterances is identified within a predetermined time period, a sample of the questionable utterances is selected (block 45). The sample can be selected randomly, specifically, or via a combination of random and specific parameters. Selecting a sample is further described below with reference to FIG. 6.

Once selected, the sample of similar questionable utterances is transmitted to a human transcriber for confirming the assigned transcribed values for or assigning further transcribed values to each utterance in the sample. The questionable utterances in the sample can be transmitted to the same human transcriber or alternatively, to different human transcribers. Each similar questionable utterance in the sample is analyzed to identify the correct transcribed value associated for that utterance. Upon receipt from the human transcriber, the confirmed or newly assigned transcribed values are compared. If all questionable utterances in the sample are associated with the same transcribed value (block 46), the common transcribed value is then confirmed for or assigned (block 47) to all the questionable utterances in the pool from which the sample was selected. The common transcribed value is confirmed for those questionable utterances having initial transcribed values that match the common transcribed value. The common transcribed value is assigned to the questionable utterances when the initial transcribed value is different from the common transcribed value. If no common transcribed value is provided for the similar questionable utterances in the sample, each remaining questionable utterance in the pool is then transmitted to the human transcriber (block 48) for further review, such as for confirmation of the initial transcribed value or assignment of a further transcribed value.

The transcribed values confirmed or assigned by the human transcriber can be incorporated into the initial transcribed message (block 49) for the corresponding utterance, which can be provided to the caller (block 50). In a further embodiment, the transcribed value and associated utterance can be stored with the grammar or used to generate a further grammar.

Figure 4:
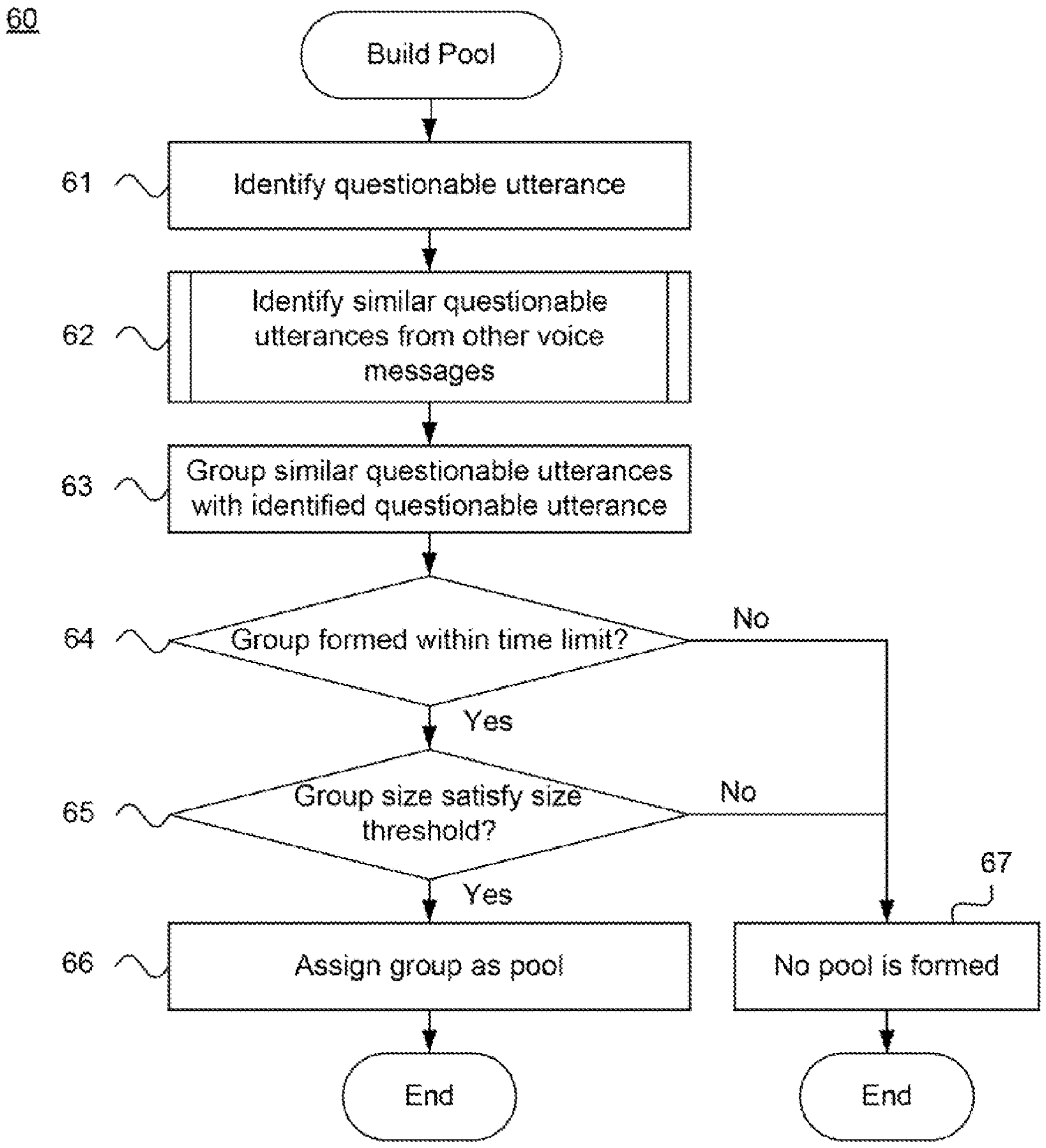
FIG. 4 is a process flow diagram showing, by way of example, a method for building pools of similar utterances for use in the process of FIG. 3.

During hybrid voice transcription, a subset of similar questionable utterances can be identified and transmitted for further processing to increase the accuracy of fully automated speech recognition systems, while maintaining efficiency and reducing cost. The subset of similar questionable utterances can be generated as a pool from which a sample can be selected. FIG. 4 is a process flow diagram showing, by way of example, a method 60 for building pool of similar questionable utterances for use in the process of FIG. 3. Questionable utterances are identified (block 61) from an initial transcribed message based on a confidence score for a corresponding initial transcribed value assigned to each utterance. In one embodiment, the questionable utterances include those utterances with initial transcribed values having confidence scores that fall below a predetermined accuracy threshold. At least one of the questionable utterances is selected and monitored for a predetermined amount of time during which questionable utterances in voice streams from other calls are watched. The other questionable utterances that are similar to the selected questionable utterance are identified (block 62) and grouped with the questionable utterance (block 63).

Figure 5:
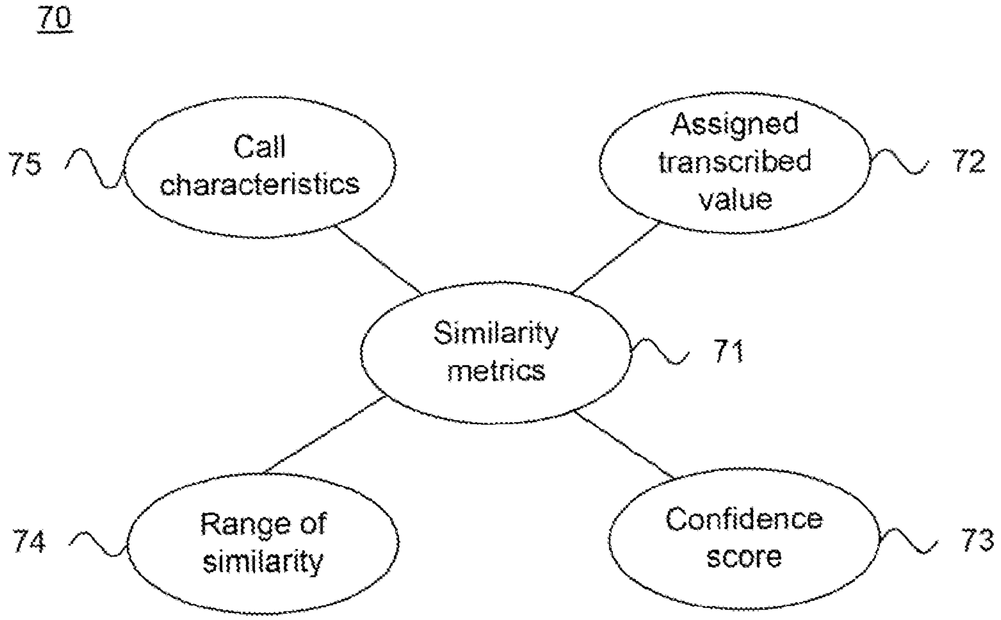
FIG. 5 is data flow diagram showing, by way of example, similarity metrics for use in the process of FIG. 4.

The similarity of two or more questionable utterances can be determined based on similarity metrics. FIG. 5 is a data flow diagram 70 showing, by way of example, similarity metrics 71 for use in the process of FIG. 4. The similarity metrics 71 include factors for determining whether two or more questionable utterances are similar, such as by the initial transcribed values 72, confidence scores 73, range of similarity 74 shared between the at least two transcribed values, and call characteristics 75. For example, using the initial transcribed value similarity factor, if two utterances have each been assigned the same initial transcribed values, the two utterances can be determined to be similar. Alternatively, even if the initial transcribed values are different, they may still considered to be similar if they fall within a similarity range of transcribed values. The identification of similar questionable utterances can also be based on the confidence score associated with the initial assigned transcribed values. For example, if two utterances are assigned a common initial transcribed value, the two utterances may only be considered as similar if the associated confidence scores fall above a confidence score threshold or within a particular range of confidence.

Also, a range of similarity 74 can also be applied to determine whether the initial transcribed value or the corresponding confidence score for a questionable utterance are within the predetermined bounds for determining similarity with another questionable utterance. As well, call characteristics, such as geographic area, age, and affiliations can be used as factors in determining whether two questionable utterances are similarly related. Further examples of determining similarity based on the similarity metrics are provided below with reference to FIG. 8.

During the identification of similar questionable utterances, at least two factors are monitored to determine whether the grouped similar questionable utterances form a pool from which a sample can be selected for further analysis. The factors include a time threshold (block 64) and a size threshold (block 65). Regarding the time limit threshold, an automatically determined or predetermined time period is selected during which a pool of similar questionable utterances must be grouped. If grouped within the selected time period (block 64), the similar utterances are recognized as a pool from which a sample of the questionable utterances can be selected. However, if not grouped within the time period, each similar questionable utterance identified is transmitted to the human transcriber for individual analysis. The time period can be an absolute time or a period of time that covers a range. Additionally, the size threshold can be applied to require that a grouping of similar questionable utterance reaches a certain size to be considered a pool. The size threshold can be automatically determined or predetermined to establish a particular number of similar questionable utterances that must be grouped to form a pool from which a sample can be selected. If the size threshold is satisfied (block 65), one or more of the similar questionable utterances can be selected as a sample for further analysis, whereas each of the similar questionable utterances are transmitted for further analysis when the size threshold is not satisfied.

Setting the size and time thresholds can be determined based on a type of voice stream, accuracy of transcription required, and type of service agreement signed. The type of voice stream can include a real-time voice stream or a recorded voice message. When the utterances are being provided in a real time voice stream during a live call, the time for identifying similar questionable utterances should be shorter since the caller is waiting on the call. In one embodiment, the time limit can be set at three to thirty seconds for a real time call. However, when the utterances are provided in a recorded voice message, the time to identify similar questionable utterances can be longer. In one embodiment, the time limit can be set at 30 minutes for a recorded voice message. With respect to live calls, the size threshold can be set lower, such that fewer similar utterances are required to form a pool. Additionally, for recorded calls, the size threshold can be set higher since more time is provided to identify similar questionable utterances.

Further, the size threshold for a pool can be determined based on an accuracy of the transcription required. For example, a larger pool provides more accurate results, whereas a smaller pool provides more relaxed results. High accuracy transcription may be required in court reporting and lower accuracy may be required for simple consumer calls that request information.

In one embodiment, the time limit is monitored and upon expiration, the identified similar utterances are analyzed to determine whether the size threshold is satisfied. If the pool fails to satisfy either the sized threshold or the time limit, no pool of the similar questionable utterances is formed. However, if a pool of similar questionable utterances satisfies the size threshold and is formed within the predetermined time limit, the pool is assigned as a pool for use in hybrid voice transcription.

Figure 6:
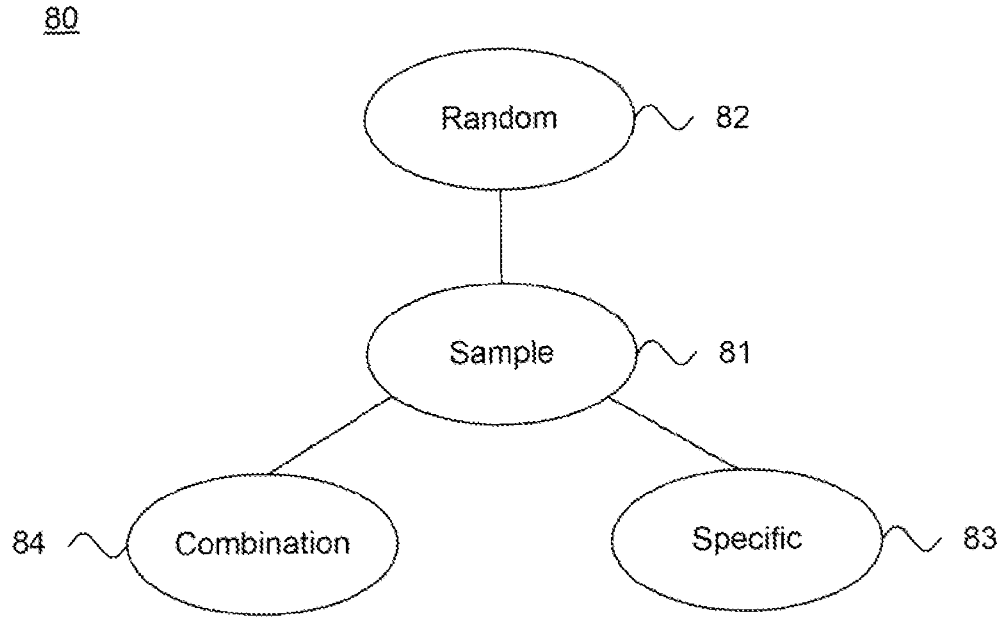
FIG. 6 is a data flow diagram showing, by way of example, metrics for obtaining a sample from the pools of FIG. 4.

Once the pool of similar questionable utterances is generated, a sample can be selected for sending to the human transcriber. FIG. 6 is a data flow diagram 80 showing, by way of example, metrics for obtaining a sample 81 from the pools of FIG. 4. A sample can be obtained from a pool based on random sampling 82, specific sampling 83, or a combination of random and specific sampling 84. During a random sampling, one or more questionable utterances are selected from the pool at random. The number of selected questionable utterances can be automatically determined or determined by a user. During specific sampling, particular questionable utterances are selected as representative of the sample based on factors, including confidence score, characteristics of the caller, subject matter, and noise, as well as other factors. A combination of random sampling and specific sampling can also be used. For instance, a predetermined number of questionable utterances can be selected through random sampling, while a further set of questionable utterances can be selected through specific sampling to generate a complete sample. In a further embodiment, random sampling can be used to identify a sample of questionable utterances, which can be further refined through specific sampling. Other combinations of random sampling and specific sampling are possible.

The size of a sample can be determined based on an accuracy of the transcription required. For example, a larger sample provides more accurate results, whereas a smaller sample provides more relaxed results. High accuracy transcription may be required in legal proceedings, such as court reporting, while lower accuracy results may be sufficient for simple consumer calls or other activities.

Figure 7:
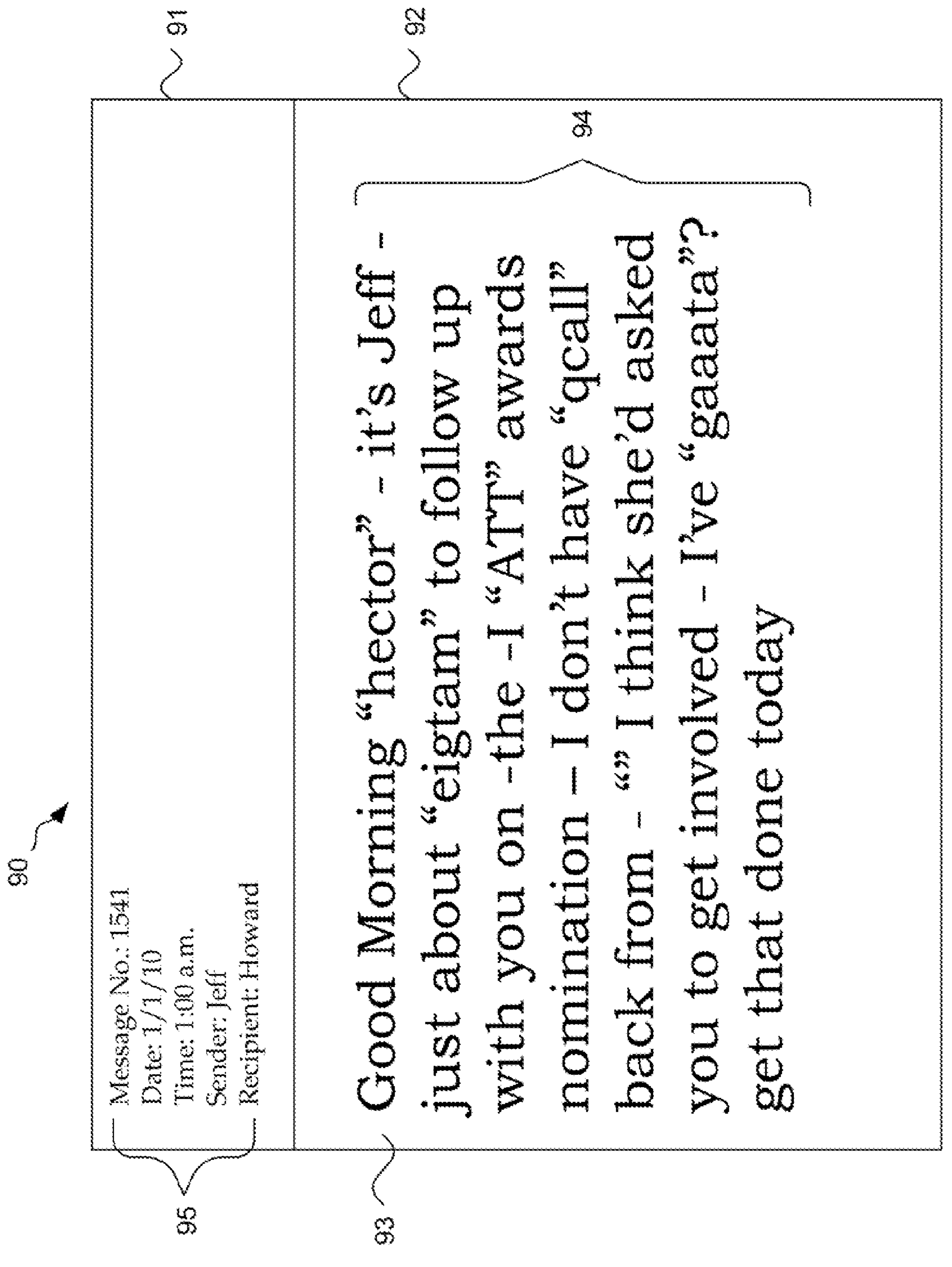
FIG. 7 is a block diagram showing, by way of example, an initial transcribed message.

FIG. 7 is a block diagram showing, by way of example, a transcribed message 90. The transcribed message 90 includes a message details box 91 and a text box 92. The message details box 91 includes fields for message characteristics, including, for example, message identification, date, time, sender, and recipient. Other message characteristics are possible, such as identification of related messages or time required to transcribe the message.

The message identification field can include a number, letter, or symbol for representing a transcribed message for a particular voice stream. Corresponding voice streams and transcribed messages can have the same or different identification values, as well as related identification values. The date field can include the date on which the original voice stream was received, the date on which the voice stream was transcribed, or the date on which the transcribed message was provided to a caller. In one embodiment, the date for receiving the voice stream, for transcribing the voice stream, and for providing the transcribed message is the same. Similar to the date field, the time field can include the time at which the original voice stream was received, the time at which the voice stream was transcribed, or the time at which the transcribed message was provided to a caller.

The sender field can include the name of an individual, business entity, or other sender. Additionally, other sender identifiers can be used, such as an identification number for or telephone number of the sender. Similarly, the recipient field can also include the name of an individual, a business entity, or other recipient, as well as other identifiers, such as an identification number or telephone number. Other identifiers are possible. As well, the recipient field can include one or more recipients, each identified by the same or different types of identifiers.

In the text box 92, an initial message 94 transcribed via automated speech recognition can be provided. In the transcribed message 94, each utterance in the corresponding voice stream is assigned a transcribed value, which is represented as text. The transcribed message 94 in the text box reads:

> Good Morning "hector"—it's Jeff—just about "eigtam" to follow up with you on—the—I "ATT" awards nomination—I don't have "qcall" back from—" "I think she'd asked you to get involved—I've "gaaata"? get that done today Each transcribed utterance can be associated with a confidence score (not shown), which reflects a level of certainty as to whether the transcribed value accurately reflects the voiced utterance.

An accuracy threshold can be applied to the confidence scores of each utterance in the initial transcribed message 94 to identify those utterances with transcribed values having confidence scores below the threshold as questionable utterances. If above the threshold, the transcribed values assigned to the utterances can be considered accurate or fairly accurate. Meanwhile, the questionable utterances can have a likelihood of being associated with an incorrect transcribed value. The confidence score reflects the likelihood of accurate transcription. In the transcribed message 94, the questionable utterances can be identified by quotation marks. In place of, or in addition to, the quotation marks, the questionable utterances can also be displayed by highlighting one or more utterances, displaying one or more utterances in an utterance box, and through different font sizes and styles.

Figure 8:
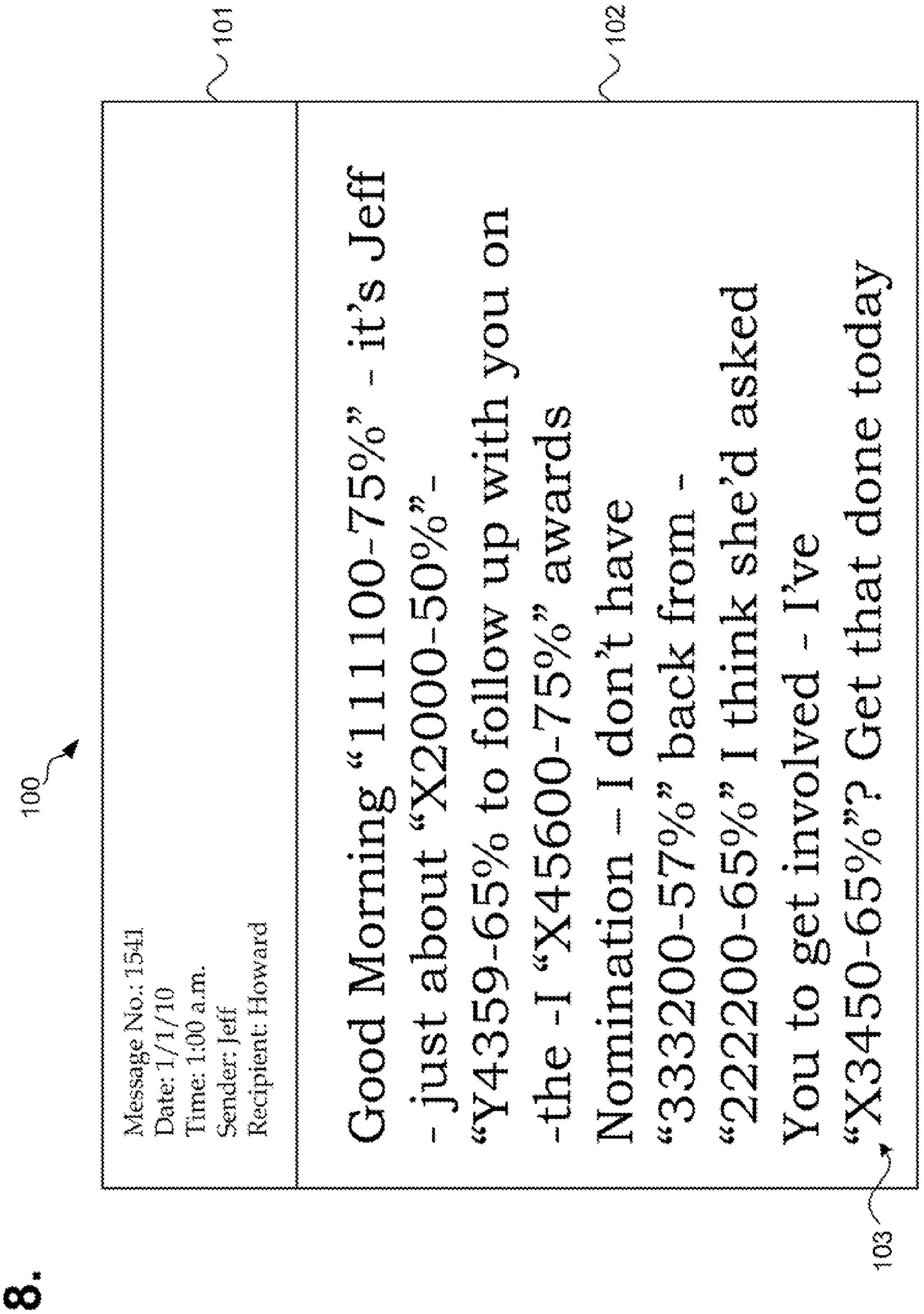
FIG. 8 is a block diagram showing, by way of example, the transcribed message of FIG. 7 with identification values representing transcribed values for questionable utterances.

The transcribed values for the questionable utterances can each be represented by identification values for use in identifying similar questionable utterances. FIG. 8 is a block diagram showing, by way of example, a transcribed message with identification values representing transcribed values for questionable utterances. Each transcribed value associated with a questionable utterance in the transcribed message is replaced with an identification value and a confidence score for the transcribed value. The identification value can include a number, code, or symbol. Each transcribed value is assigned a different identification value; however, the same or similar transcribed values may be assigned the same identification value. Other types and assignments of identification values are possible. The questionable utterances can be displayed with quotation marks or other displays, including highlighting, font size, and utterance boxes. For instance, in the transcribed message, the transcribed values having a confidence score above the threshold can be represented as text, which is highlighted in a first color, and the questionable utterances can be represented as text that is highlighted in a second color.

One or more of the questionable utterances can be selected and watched for a predetermined amount of time during which attempts are made to locate similar questionable utterances. Returning to the above example, a threshold of 80% is applied to the transcribed values in the message. Those utterances associated with transcribed values having a confidence level lower than the threshold are selected as questionable utterances. Thus, the utterances associated with transcribed values identified by the values "111100," "X2000," "Y4359," "X45600" "333200," "222200," and "X3450" are selected as questionable utterances. Further, the questionable utterance associated with the transcribed value "gaaata" is selected. "Gaaata" is represented by the identification value "X3450" with a confidence score of 65%. The corresponding questionable utterance is then watched for a time period of 30 minutes during which attempts to locate similar questionable utterances are made.

Figure 9:
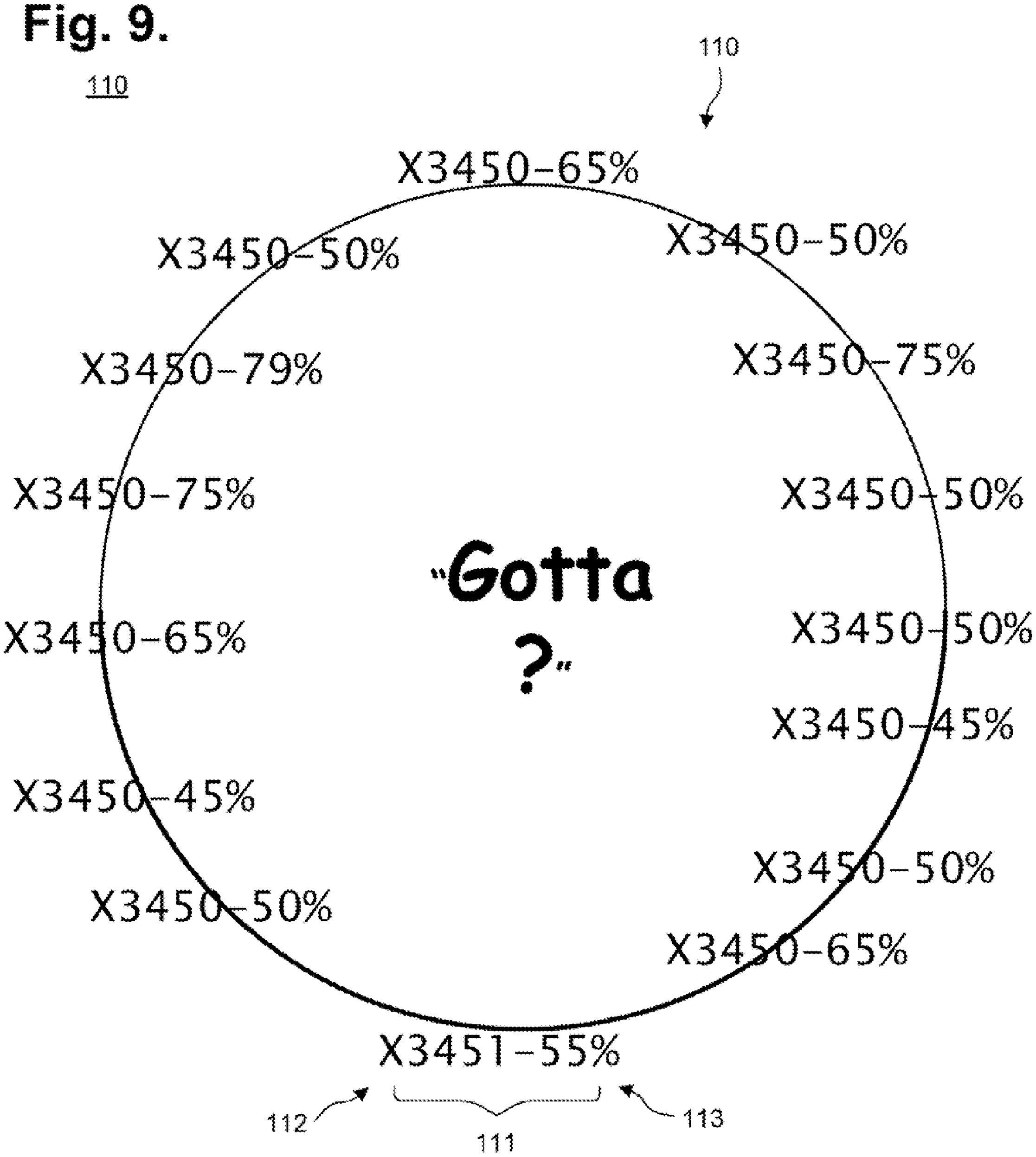
FIG. 9 is a block diagram showing, by way of example, a pool of similar questionable utterances.

The located similar questionable utterances form a pool with the selected questionable utterance. FIG. 9 is a block diagram showing, by way of example, a pool of similar questionable utterances 110. As described above with reference to FIG. 4, the pool can be generated from a predetermined number of similar questionable utterances, which are identified within a predetermined amount of time. Each questionable utterance 111 in the pool 110 is represented by an identification value 112, which is based on a transcribed value, and a confidence score 113. The similarity between questionable utterances can be determined based on similarity metrics, including an assigned transcribed utterance, confidence score, range of similarity, and call characteristics. However, other similarity metrics are possible. Returning to the above example, the transcribed value "gaaata" is watched while a search is performed for similar questionable transcribed utterances. A further questionable utterance with the transcribed value "gotta" is identified. The further transcribed value is assigned an identification value of "X3451" with a confidence score of 55%. A similarity comparison of the transcribed values is performed between the two questionable utterances based on one or more of the similarity metrics. For instance, in this example, the applicable similarity metrics include the assigned transcribed value, confidence score, and range of similarity. The transcribed value "gaaata" is associated with the identification value of "X3450," while "gotta" has an identification value of "X3451." The assigned transcribed value similarity metric requires that the identification value of two or more utterances fall within a range of five. In this case, the identification values of the two utterances differ by a value of one. Accordingly, the two utterances are considered similar.

For the confidence score comparison, an automatic threshold or a predetermined threshold can be used to identify similar questionable utterances. For instance, a confidence score threshold of 35% is selected and those utterances with similar identification values, as described above, that have confidence scores over 35% can be selected as similar. Further, use of the bounded range similarity metric requires that the identification value, confidence score, or both the identification value, and confidence scores fall within a predetermined bounded range, including an upper and lower limit for two or more utterances to be considered similar.

Also, call characteristics can be used as factors for determining similarity between two or more questionable utterances, including any aspect of a call or the caller, such as location, topic, emotion, accent, gender, and age. Other call characteristic factors are possible. The call characteristics can be provided by a caller or obtained from an analysis of the call, such as by caller ID.

In one example, an utterance with a transcribed value of "U-dub" is parsed from a voice stream. A caller in Oregon generated the voice stream during a call to a call center. The location of the caller can be identified via caller ID or directly provided by the caller. Alone, the transcribed value "U-dub" could refer to the University of Washington or the University of Wisconsin. Consideration the location information can help distinguish the correct reference for "U-dub." A caller located in the Pacific Northwest, such as Washington or Oregon, is more likely to refer to the University of Washington. However, a caller in the Midwest, such as Wisconsin is more likely to use "U-dub" as a reference to the University of Wisconsin. Accordingly, in the current example, "U-dub," will have a higher similarity to other references to the University of Washington, rather than references to the University of Wisconsin. Additionally, utterances with a transcribed value of "U-dub" from a caller in Oregon and caller in Wisconsin would not be considered similar.

Additionally, in a further example, age can be used as a factor for grouping similar utterances that represent slang. "Scrilla" is a term of slang that is used by youth and young adults to refer to money. Thus, knowledge of a caller's age can help determine whether the transcribed value for "scrilla" is a single term or a portion of a term, such as gorilla. If "scrilla" is identified in a voice stream from a caller that is 18 years old, the term likely refers to money, whereas, from a caller that is 59 years old, "scrilla" is likely to be an incomplete or inaccurate transcription of the utterance. Accordingly, the two transcribed utterances would not be considered similar.

Once a pool of similar questionable utterances has been formed, a sample of the questionable utterances can be selected for transmitting to one or more human transcribers, as described above in detail with reference to FIG. 6. Each questionable utterance in the sample is individually transcribed via manual transcription. If the same transcribed value is assigned to each questionable utterance in the sample, the common transcribed value is assigned to each of the remaining questionable utterances in the pool. When the common transcribed value is different than the initial transcribed value, the assigned common value replaces the initially assigned transcribed value. The transcribed message to which the questionable utterance belongs is also updated to reflect the common transcribed value. However, if the common transcribed value is the same as the initially transcribed value, the initially transcribed value is confirmed as being a correct representation of the associated utterance. If different transcribed values are assigned to the questionable utterances in the sample, each of the remaining questionable utterances in the pool are manually transcribed.

Figure 10:
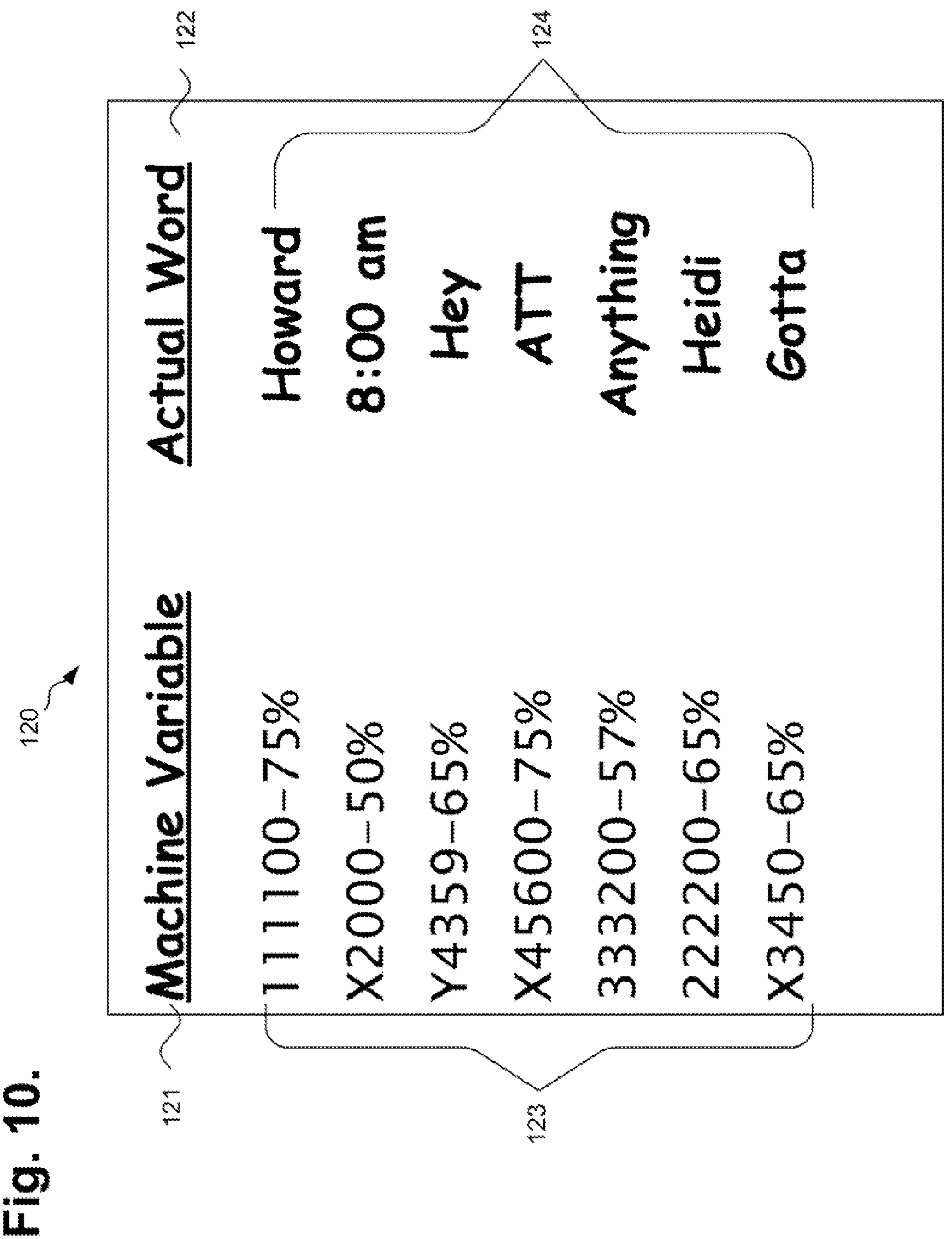
FIG. 10 is a block diagram showing, by way of example, a transcribed utterance value chart.

The manually assigned transcribed values can be stored for further reference. FIG. 10 is a block diagram showing, by way of example, a transcribed value chart 120. The transcribed value chart 120 includes questionable utterances identified for at least one voice stream, which are each represented by an identification value and confidence score 123. The identification value and confidence score can be assigned during automated speech recognition 121. Additionally, the transcribed value chart 120 includes the actual transcribed values 122, which can include the transcribed values 124 provided by the human transcriber or the transcribed value provided by automated speech recognition. The actual transcribed values have been verified as having a high likelihood of correctly representing the corresponding utterance. In one embodiment, the questionable utterances and transcribed values can be stored separately for each voice stream or alternatively, the questionable utterances and transcribed values can be stored for more than one voice stream.

In a further embodiment, the voice utterance and assigned transcribed value can be added to the grammar, which is used during automated speech recognition to assign initial transcribed values to the utterances in the voice stream, as described above in FIG. 3. In yet a further embodiment, the voice utterance and assigned transcribed value are only added to the grammar after the transcribed value has been assigned to the utterance on a predetermined number of occasions. For instance, a predetermined number of occurrences can be set at two. Returning to the above example, an utterance is initially assigned a transcribed value of "gaaata." However, after additional analysis, the utterance is assigned a further transcribed value of "gotta." A further utterance is subsequently received, which is the same as or similar to the previously received utterance. The further utterance is also assigned an initial transcribed value of "gaaata." Upon further analysis, the initial transcribed value is replaced with a subsequent transcribed value "gotta." Since the same or similar utterances have been twice assigned the transcribed value "gotta," the new transcribed value can then be added to the grammar. Once added, the next time the same or similar utterance is received, the term "gotta" is initially assigned as the transcribed value without having to undergo further analysis, such as by a human transcriber.

In yet a further embodiment, the voice utterance and assigned transcribed value can be added to a secondary grammar. The addition of a transcribed value to a secondary grammar can be effective when the transcribed value is not commonly used enough to warrant addition to the main grammar or when the addition of the transcribed value would deteriorate the effectiveness of a similar transcribed value on the main grammar that is more important. Returning to the above example, instead of being added to the grammar, the transcribed value "gotta" is assigned to a secondary grammar since the term "gotta" is slang for the phrase "got to." The next time the same or similar utterance is received, the utterance is compared with the main grammar and then the secondary grammar from which the term "gotta" is initially assigned as the transcribed value without having to undergo further analysis, such as by a human transcriber. As described above, the assignment of the transcribed value may be required to occur a particular number of times before the transcribed value is added to the secondary grammar. Additional grammars are also possible, including third, fourth, and fifth grammars.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for reducing voice transcription error, comprising:

a mobile device configured to collect audio during a call, and configured to generate audio data from the collected audio; and a server comprising a central processing unit, memory, an input port that receives the audio data and an output port, wherein the central processing unit is configured to;

parse the audio data from the mobile device into utterances;

assign a transcribed value and confidence score to each utterance;

identify utterances with low confidence scores as questionable utterances;

select one of the questionable utterances and form a pool of questionable utterances comprising the selected questionable utterance and further comprising other questionable utterances, from other calls, that have transcribed values similar to the transcribed value of the selected questionable utterance;

apply a size threshold to the pool of questionable utterances;

provide each questionable utterance in the pool to a human transcriber when the pool fails to satisfy the size threshold; and receive from the human transcriber a further transcribed value for each of the questionable utterances in the pool.

2. A system according to claim 1, further comprising:

a message generator to generate for the call a transcribed message comprising:

the transcribed values for the utterances not identified as questionable; and one of: the further transcribed value, or the transcribed value assigned to the selected questionable utterance.

3. A system according to claim 2, wherein the transcribed message is associated with message details comprising at least one of a message identifier, date, time, sender, recipient, identification of related messages, and time required to transcribe the message.

4. A system according to claim 2, wherein the transcribed message includes the further transcribed value when the further transcribed value is different than the transcribed value assigned to the selected questionable utterance.

5. A system according to claim 1, wherein the central processing unit is further configured to:

determine a similarity between the selected questionable utterance and the other questionable utterances in the pool, wherein the similarity is based on one or more of the confidence scores, a range of similarity shared between the assigned transcribed values, and characteristics of the call.

6. A system according to claim 1, wherein the central processing unit is further configured to:

determine that the similar transcribed values of the other questionable utterances and the assigned transcribed value of the selected questionable utterance are similar when the similar transcribed values are the same as the assigned transcribed value of the selected questionable utterance.

7. A system according to claim 1, wherein the central processing unit is further configured to:

determine that the similar transcribed values of the other questionable utterances and the assigned transcribed value of the selected questionable utterance are similar when the confidence score assigned to the selected questionable utterance satisfies at least one of a confidence score threshold and a predetermined range of confidence, and when a confidence score associated with each of the similar transcribed values satisfies at least one of the confidence score threshold and the predetermined range of confidence.

8. A system according to claim 1, wherein the central processing unit is further configured to:

determine that the similar transcribed values of the other questionable utterances and the assigned transcribed value of the selected questionable utterance are similar when the similar transcribed values and the assigned transcribed value of the selected questionable utterance are different, and when the similar transcribed values and the assigned transcribed value of the selected questionable utterance both fall within a predetermined range of transcribed values.

9. A system according to claim 1, wherein the central processing unit is further configured to:

determine based on a desired accuracy of transcription, the size threshold.

10. A computer-implemented method for reducing voice transcription error, comprising:

collecting, via a mobile device, audio during a call, and generating audio data from the collected audio;

gathering via a server the audio data from the mobile device, wherein the server comprises a central processing unit, memory, an input port to receive the audio data, and an output port;

parsing the audio data from the mobile device into utterances;

assigning a transcribed value and confidence score to each utterance;

identifying utterances with low confidence scores as questionable utterances;

selecting one of the questionable utterances from the audio data and forming a pool of questionable utterances comprising the selected questionable utterance and further comprising other questionable utterances, from other calls, that have transcribed values similar to the transcribed value of the selected questionable utterance;

applying a size threshold to the pool of questionable utterances;

providing each questionable utterance in the pool to a human transcriber when the pool fails to satisfy the size threshold; and receiving from the human transcriber a further transcribed value for each of the questionable utterances in the pool.

11. A method according to claim 10, further comprising:

generating for the call a transcribed message, the transcribed message comprising the transcribed values for the utterances not identified as questionable and further comprising one of: the further transcribed value, or the transcribed value assigned to the selected questionable utterance.

12. A method according to claim 11, wherein the transcribed message is associated with message details comprising at least one of a message identifier, date, time, sender, recipient, identification of related messages, and time required to transcribe the message.

13. A method according to claim 11, wherein the transcribed message includes the further transcribed value when the further transcribed value is different than the transcribed value assigned to the selected questionable utterance.

14. A method according to claim 10, further comprising:

determining a similarity between the selected questionable utterance and the other questionable utterances in the pool, wherein the similarity is based on one or more of the confidence scores, a range of similarity shared between the assigned transcribed values, and characteristics of the call.

15. A method according to claim 10, further comprising:

determining that the similar transcribed values of the other questionable utterances and the assigned transcribed value of the selected questionable utterance are similar when the similar transcribed values are the same as the assigned transcribed value of the selected questionable utterance.

16. A method according to claim 15, further comprising: determining that the similar transcribed values of the other questionable utterances and the assigned transcribed value of the selected questionable utterance are similar when the confidence score assigned to the selected questionable utterance satisfies at least one of a confidence score threshold and a predetermined range of confidence, and when a confidence score associated with each of the similar transcribed values satisfies at least one of the confidence score threshold and the predetermined range of confidence.

17. A method according to claim 10, further comprising: determining that the similar transcribed values of the other questionable utterances and the assigned transcribed value of the selected questionable utterance are similar when the similar transcribed values and the assigned transcribed value of the selected questionable utterance are different, and when the similar transcribed values and the assigned transcribed value of the selected questionable utterance both fall within a predetermined range of transcribed values.

18. A method according to claim 10, further comprising: determining based on a desired accuracy of transcription of the data values for the call the size threshold.

* * * * *